United States Patent
Choudhuri

(10) Patent No.: US 10,114,741 B1
(45) Date of Patent: Oct. 30, 2018

(54) DATA TRAFFIC RESERVATION SYSTEMS AND METHODS

(71) Applicant: Levyx, Inc., Irvine, CA (US)

(72) Inventor: Siddharth Choudhuri, Irvine, CA (US)

(73) Assignee: LEVYX, INC., Irvine, CA (US)

( * ) Notice: Subject to any disclaimer, the term of this patent is extended or adjusted under 35 U.S.C. 154(b) by 0 days.

(21) Appl. No.: 15/360,242

(22) Filed: Nov. 23, 2016

(51) Int. Cl.
*G06F 3/06* (2006.01)
*G06F 12/02* (2006.01)

(52) U.S. Cl.
CPC .......... *G06F 12/023* (2013.01); *G06F 3/0613* (2013.01); *G06F 3/0647* (2013.01); *G06F 3/0656* (2013.01); *G06F 3/0683* (2013.01); *G06F 2212/1016* (2013.01)

(58) Field of Classification Search
CPC .................................................... G06F 3/0656
See application file for complete search history.

(56) References Cited

U.S. PATENT DOCUMENTS

| | | | |
|---|---|---|---|
| 5,566,175 A | 10/1996 | Davis | |
| 7,397,809 B2 | 7/2008 | Wang | |
| 7,609,636 B1 | 10/2009 | Mott | |
| 7,733,889 B2 | 6/2010 | Katayama | |
| 2004/0160916 A1 | 8/2004 | Vukovic et al. | |
| 2015/0378953 A1* | 12/2015 | Debbage | G06F 13/4221 710/117 |
| 2015/0381518 A1 | 12/2015 | Lee et al. | |
| 2016/0277322 A1 | 9/2016 | Christophersen | |

* cited by examiner

*Primary Examiner* — Edward J Dudek, Jr.
(74) *Attorney, Agent, or Firm* — Fish IP Law, LLP

(57) ABSTRACT

An improved transmission system that utilizes a shared buffer accessible by multiple threads, processes, or other discrete systems of different producing speeds is disclosed which limits transmission bottlenecks which occur when producers write data at different speeds. The system reserves portions of the shared buffer for each of the different producers, and allows the producers to write to the shared buffer asynchronously—even if the shared buffer is read from serially. This allows a fast producer to write its data to the shared buffer without needing to wait "in line" for slower producers.

14 Claims, 5 Drawing Sheets

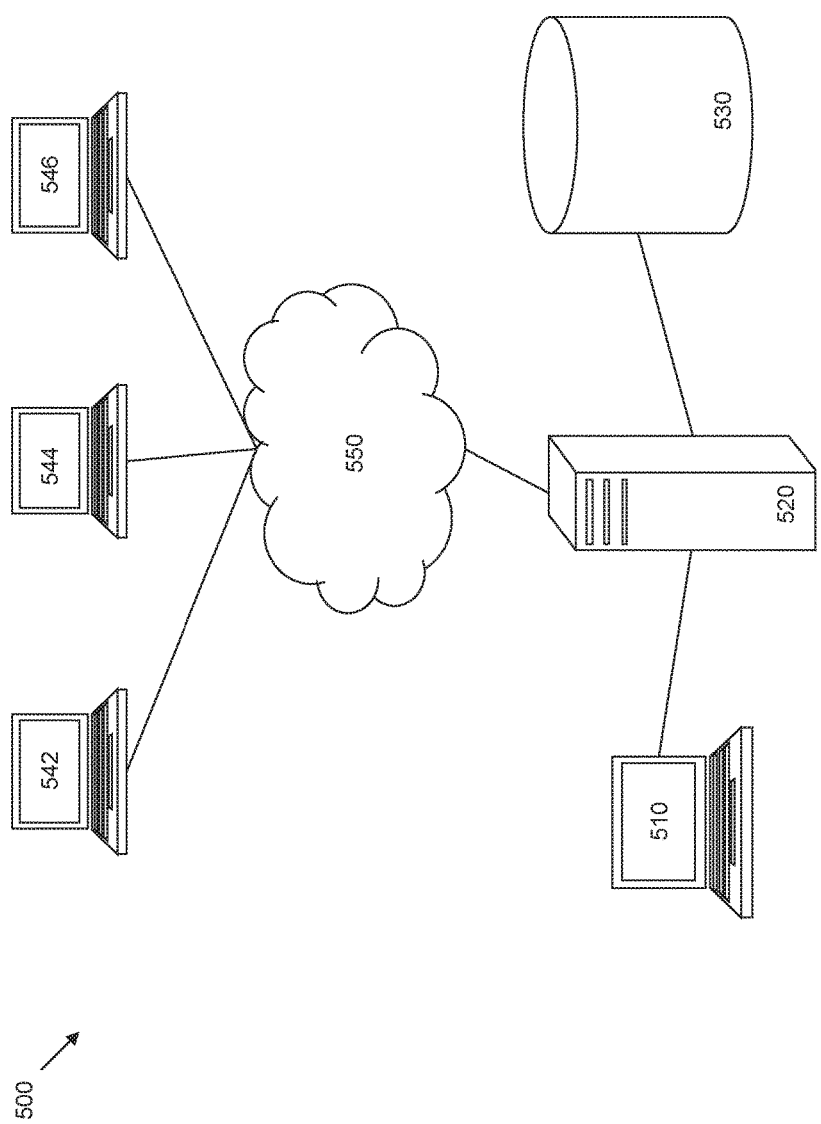

DATA TRAFFIC RESERVATION SYSTEMS AND METHODS

FIELD OF THE INVENTION

The field of the invention is electronic data structures.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The amount of information archived on computer storage is constantly increasing. Sorting through increasing amounts of information can be incredibly time-consuming for even the most advanced computer systems without systems and methods for optimizing methods to transport data. Every element of data processing needs to be optimized and streamlined to prevent bottlenecks A common bottleneck of data processing is sending/receiving data from remote systems, particularly if several processors or threads need to use a single common buffer to transmit data to a remote system.

U.S. Pat. No. 5,566,175 to Davis teaches a broadband telecommunications system that maximizes bandwidth utilization with a FIFO buffer by reserving a larger bandwidth when there is more data to transfer and a smaller bandwidth when there is lesser data to transfer. Davis' system, however, is not useful in increasing data flow when a plurality of threads are using the same shared buffer for transport, and a plurality of threads are waiting for a first thread to transmit data before transmitting their data.

U.S. Pat. No. 7,397,809 to Wang teaches an improved combined switching data unit queuing discipline, that uses a plurality of FIFO queues of a hybrid output port, allowing for a plurality of threads to be spread among several FIFO queues. Wang's system, however, still forces a fast thread to wait for a slow thread if the fast thread happens to be unluckily placed behind a slow thread.

U.S. Pat. No. 7,733,889 to Katayama teaches a network switching device that prevents a blocking problem by dividing received packets into multiple fixed length packets and supplying them to a buffer. In this manner, if a slow thread happens to be transmitting data slower than a fast thread, then the slow thread does not slow down the fast thread as much since the fast thread is able to transmit its data as soon as one fixed length packet is transmitted by the slow thread. Katayama's system, however, still forces a fast thread to wait until the slow thread completes at least one fixed length packet's worth of transmission before accepting data from the fast thread.

Thus, there remains a need for a system and method to improve the throughput and transmission of data from multiple sources through a single bottleneck.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which data is asynchronously written to a shared buffer that is read from serially.

As used herein, a "shared buffer" that is read from serially is read continuously from a head memory address to a tail memory address. In some embodiments, the shared buffer could be a circular buffer such that the consuming entity reading the shared buffer will start reading from the head address once it reaches the tail address.

The shared buffer could be any shared buffer that is configured to be read from serially, for example a modified FIFO buffer, a BUS on a computer, or a network pipeline. The shared buffer receives several requests to transmit data using the shared buffer from various threads, processes, or discrete computer systems. As each request is received by the system, the system allocates memory blocks of the shared buffer for each request. The system provides access to each allocated memory block to each requesting entity via a memory location in the shared buffer. A memory location typically comprises a memory address and a size of the memory location, although in some embodiments only a memory address need be transmitted when the size is already known by the requesting entity.

Once the requesting entity receives a memory location, the requesting entity could then write data to the shared buffer. The system is configured to allow each requesting entity to write asynchronously to the shared buffer, even though the shared buffer is read serially. Since each write process is asynchronous from one another, a first requesting entity that has access to a memory location closer to the head of the shared buffer need not prevent a second requesting entity that has access to a memory location closer to the tail of the shared buffer from writing data. The first requesting entity could even write data slower than the second requesting entity, such that the second requesting entity terminates its write process before the first requesting entity terminates its write process, even though the first requesting entity initiated its write process before the second requesting entity. Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIG. 5 shows a hardware schematic of an exemplary computer system configured to transmit data using a shared buffer.

DETAILED DESCRIPTION

Figure 1:
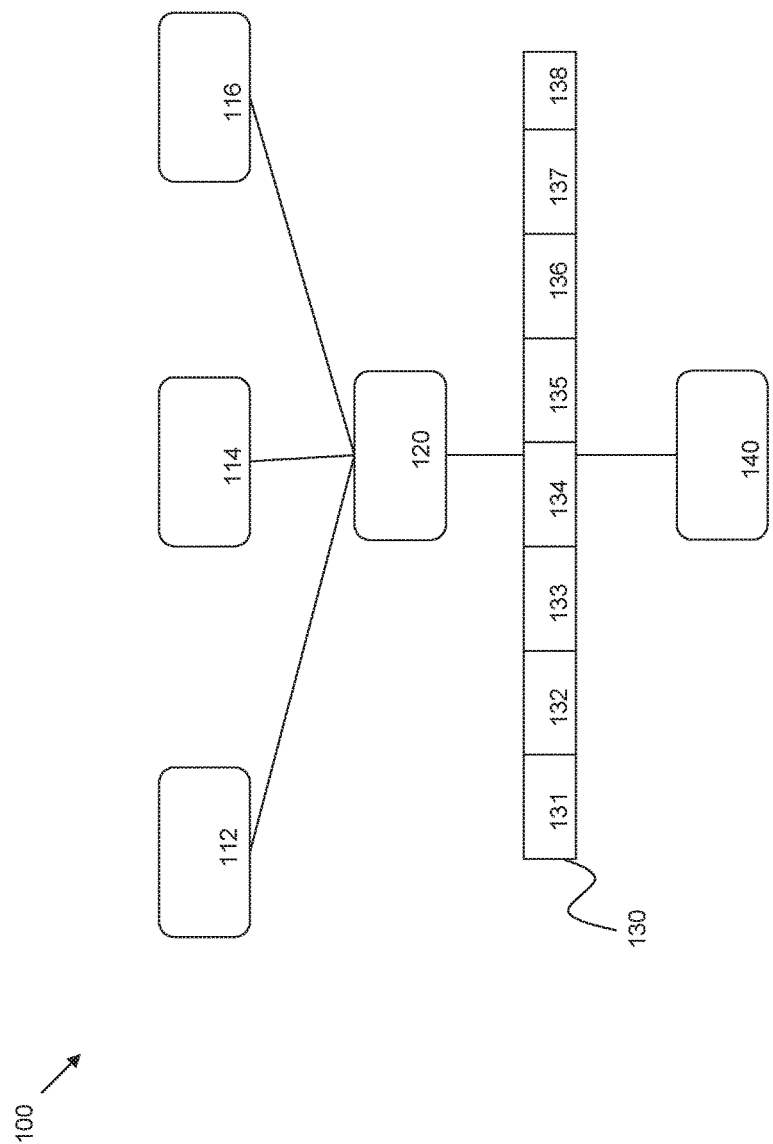
FIG. 1 shows software modules of a computer system configured to transmit data using a shared buffer.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer or a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

One should appreciate that the disclosed techniques provide many advantageous technical effects including the ability to rapidly provide data to a FIFO system.

The inventive subject matter provides apparatus, systems, and methods in which a computer system allows multiple threads to asynchronously write to a shared buffer which is serially read from.

In FIG. 1, a software schematic 100 has threads 112, 114, and 116, which provide data to a buffer handler 120 that transmits data to a distal source using shared buffer 130, which is serially read from by transmitter 140. Threads 112, 114, and 116 represent threads of one or more processes that transmit data. In some embodiments, threads 112, 114, and 116 could be threads of separate processes on separate computer systems transmitting data to a common shared buffer, such as separate computers transmitting data through a common router. In other embodiments, threads 112, 114, and 116 represent threads of a single processor on a single computer system transmitting data through a common NIC (Network Interface Controller). While three threads are shown, buffer handler 120 is preferably programmed to handle any number of threads.

In traditional FIFO shared buffers, when a first thread and then a second thread wish to transmit data using the shared buffer, the second thread needs to wait until the first thread completes its transfer before the second thread can start writing data. This leads to time inefficiencies, particularly in situations where the second thread operates faster than the first thread, even though the second thread accesses the FIFO shared buffer at an earlier time.

Buffer handler 120 solves this issue by allowing the multiple threads to write asynchronously to shared buffer 130 while shared buffer 130 is read from sequentially. Shared buffer 130 could be any suitable shared buffer, for example a circular buffer that is read sequentially from memory location 131 to 132 and so on until memory location 138, after which point shared buffer 130 reads from memory location 131 to 132 and so on. Shared buffer 130 could be considered to have a head memory address 131 and a tail memory address 138, where data is read sequentially from the head memory address to the tail memory address without skipping or jumping memory addresses. Transmitter 140 reads data sequentially from shared buffer 130 and transmits that data to a target (not shown), such as remote computer system or a storage module.

Figure 2:
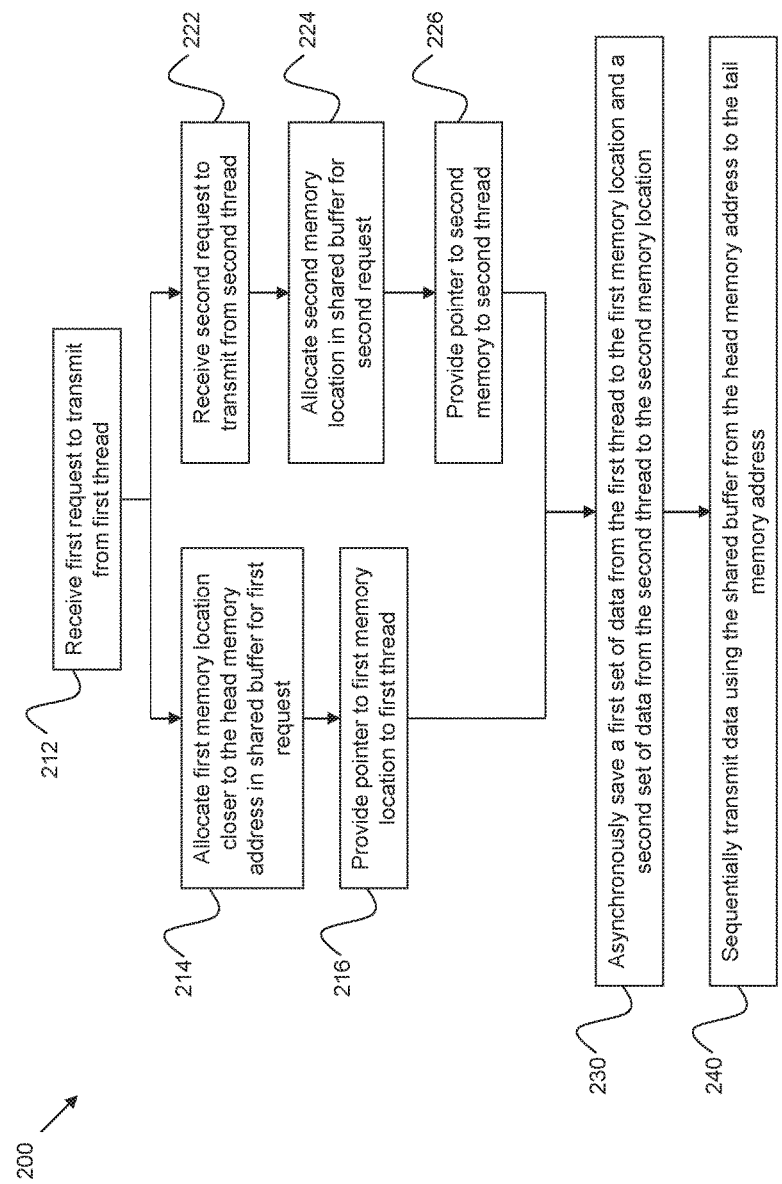
FIG. 2. shows a process used to transmit data using a shared buffer.

FIG. 2 shows an exemplary process handled by the software modules of 100. In step 212, the system receives a first request to transmit data from a first thread using the shared buffer. For example, thread 112 could send a request to buffer handler 120 to transmit data using shared buffer 130. In step 214, the system then allocates a first memory location, such as memory location 132, for the first request. A pointer to that memory location is then provided to the first thread, which can then proceed to asynchronously save data to that memory location in step 230.

In step 222, the system receives a second request to transmit data from a second thread using the shared buffer. For example, thread 114 could send a request to buffer handler 120 to transmit data using shared buffer 130 shortly after the request from thread 112 is received. In step 224, the system allocates a second memory location in the shared buffer for the second request. For example, buffer handler 120 could allocate a memory location 133 for the second request. A pointer to that second memory could then be provided to the second thread, in this example thread 114, in step 226. In step 230, the second thread could then asynchronously save the second set of data from the second thread to the second memory location.

Although the system could receive a request to transmit data using shared buffer 130 from thread 112 earlier than the request from thread 114 is received, since both threads can asynchronously save sets of data to shared buffer 130 in step 230, thread 114 will not need to wait for thread 112 to finish saving its data before it can save data to shared buffer 130. This eliminates semaphores that are traditionally used in the write process of a traditional FIFO buffer—thereby producers of data are not limited by the slowest producer! In some scenarios, the second thread could even start saving data to the shared buffer before the first thread starts saving data to the shared buffer.

In step 240, the system sequentially transmits data using the shared buffer from the head memory address to the tail memory address. For example, transmitter 140 could read and transmit data sequentially from shared buffer 130—starting from memory address location 131, proceeding to memory address location 132, then to memory address location 133, and so on and so forth until transmitter 140 reads and transmits data from memory address location 138.

The software architecture shown in software schematic 100 provides a customized FIFO buffer that still allows data to be written to the FIFO buffer, and still pops data from the FIFO buffer using a first in first out methodology, but removes many of the semaphores required when writing to the FIFO buffer. Buffer handler 120 does not need to wait for thread 112 to finish saving data to memory location 132 on shared buffer 130 before allowing thread 114 to start saving data to memory location 133 on shared buffer 130. However, transmitter 140 still needs to wait for thread 112 to finish saving data to memory location 132 before reading data from memory location 132. When thread 116 sends a request to transmit data, buffer handler 120 need not wait for both threads 112 and 114 to finish writing data before allowing thread 116 to start saving data to the shared buffer, and so on and so forth.

This configuration requires a system to alter the manner in which it saves data to a traditional FIFO buffer. However, in some embodiments, a user may not wish to alter the manner in which it saves data to its FIFO buffer. For example, a system may not grant certain users access to the FIFO buffer in that manner. In these embodiments, the system could still provide the same functionality by adding a shared buffer layer above the traditional FIFO buffer.

Figure 3:
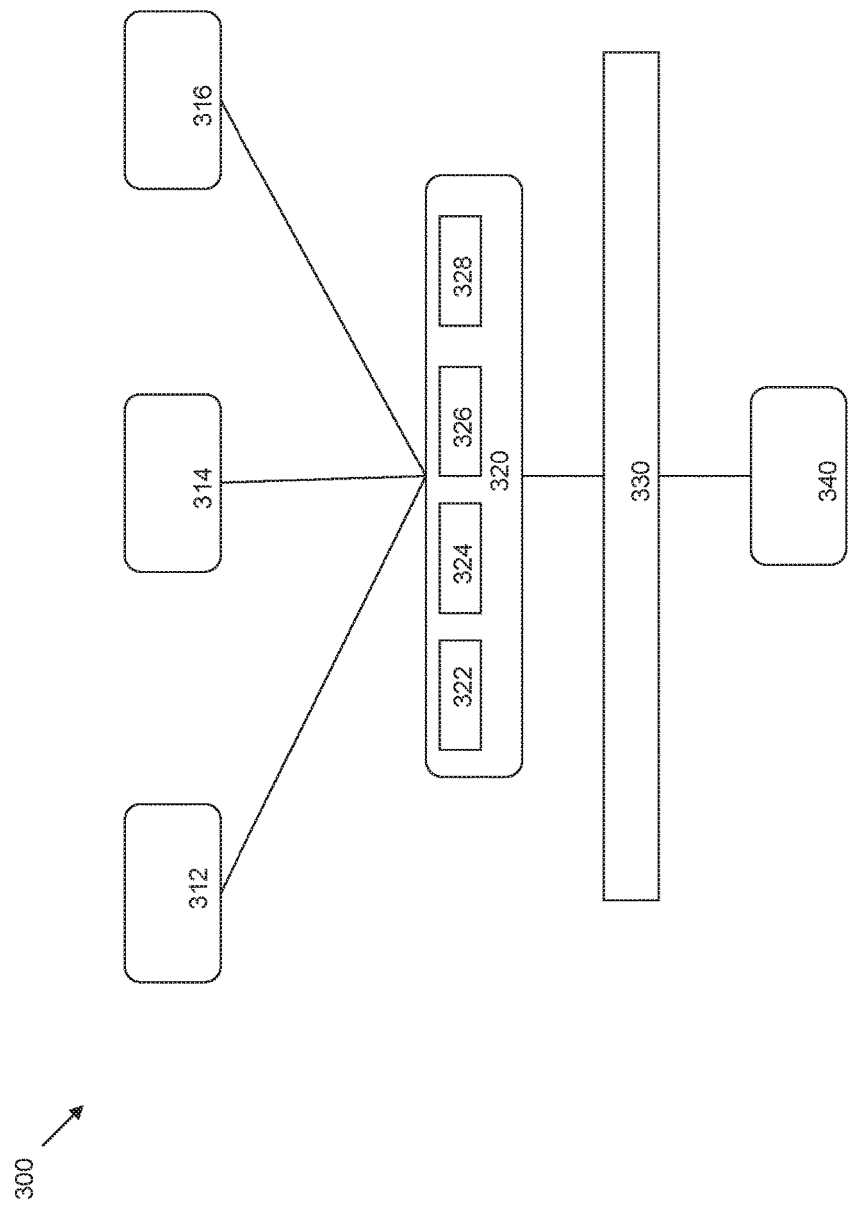
FIG. 3 shows software modules of a computer system configured to transmit data using a shared buffer and a traditional FIFO buffer.

FIG. 3 shows a software schematic 300 of such an embodiment, having threads 312, 314, and 316, which provide data to a buffer handler 320 that transmits sets of data to a traditional FIFO buffer 330, which is then read from by transmitter 140. Buffer handler 320 has several memory locations, such as memory location 322, 324, 326, and 328, respectively, which could be used to asynchronously receive data from any transmitting memory threads, and serially feed that saved data to traditional FIFO buffer 330. In this manner, the system could allow threads to asynchronously transmit data using traditional FIFO buffer 330 without needing to alter the manner in which data is written to, or read from, traditional FIFO buffer 330. While schematic 300 shows the shared buffer as being logically within buffer handler 320, the shared buffer could be external to buffer handler 320 and could even be distributed on a plurality of memory locations (e.g. spread across multiple DRAM or SSD computer-readable memory devices).

Figure 4:
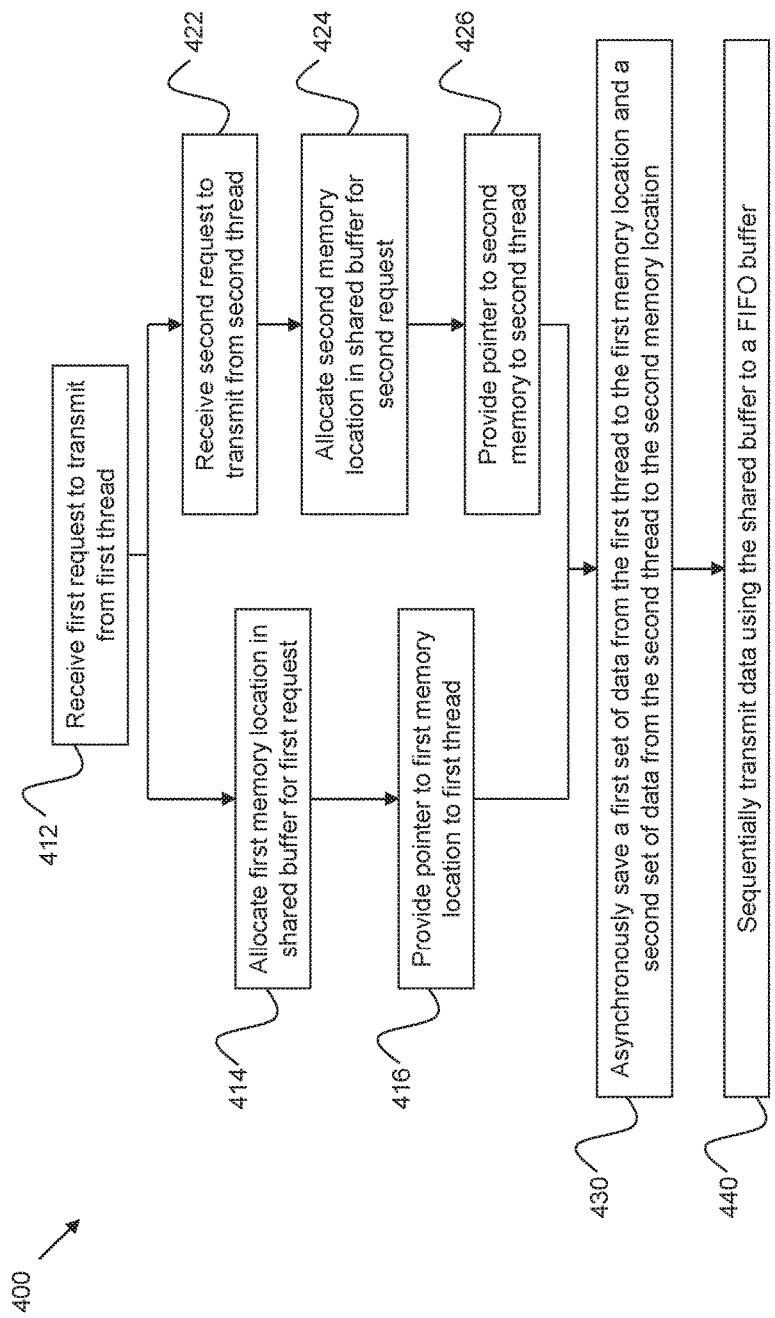
FIG. 4 shows a process used to transmit data using a shared buffer and a traditional FIFO buffer.

FIG. 4 shows an exemplary process handled by the software modules of 300. Like before, in step 412 the system receives a first request to transmit data from the first thread, such as thread 312. In step 414, the system allocates a first memory location, such as memory location 322, towards the first request, and in step 416, the system provides a pointer to the first memory location to the first thread. For example buffer handler 320 could provide a pointer to memory location 322 to first thread 312. In step 430, the first thread, such as thread 312, could save a first set of data to the first memory location, such as memory location 322, asynchronously from any other thread.

In step 422, the system receives a second request to transmit data from the second thread, such as thread 314. In step 424, the system allocates a second memory location, such as memory location 324, towards the second request, and in step 426, the system provides a pointer to the second memory location to the second thread. For example, buffer handler could be programmed to provide a pointer to memory location 324 to second thread 314. In step 430, the second thread, such as thread 314, could save a second set of data to the second memory location, such as memory location 324, asynchronously from any other thread, such as thread 312.

Buffer handler 320 stores sets of data received from the various threads requesting to transmit data using shared FIFO buffer 330. In some embodiments, buffer handler 320 could keep track of which threads had requested sets of data to be transmitted before others, and could provide the data to FIFO buffer 330 while preserving that sequential order. In preferred embodiments, buffer handler 320 transmits data to FIFO buffer 330 in accordance with a first "completed" first out algorithm instead of a first in first out algorithm. In other words, buffer handler 320 will keep track of which sets of data have been completely written to the shared buffer of buffer handler 320, and will transmit the first completed sets of data to FIFO buffer 330 to minimize wait or lag time. Transmitter 340 is programmed to sequentially read data from FIFO buffer 330—from a head memory address to a tail memory address.

FIG. 5 shows an exemplary hardware architecture 500 upon which software modules of the system, such as the modules of software schematic 100 or software schematic 300, could be installed upon. Hardware architecture 500 shows computer terminal 542, 544, and 546 functionally coupled with network 550, which is functionally coupled with server 520, which is functionally coupled with terminal 510 and database 530. In some embodiments, the system could all be installed upon a computer-readable memory of server 520, which is configured to run one or more processes to access data from database 530, and transmit that data to network 550. NIC cards frequently use a shared FIFO buffer to transmit data packets from one computer system to the next, and allowing threads running on server 520 to asynchronously write to shared FIFO buffers could decrease the number of time-consuming write collisions dramatically.

The inventive system improves computer functionality by allowing multiple users, processes, and/or threads to write to a FIFO buffer asynchronously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method for transmitting data using a shared buffer having a head memory address and a tail memory address, comprising:
   receiving a first request to transmit a first set of data before receiving a second request to transmit at least a second set of data;
   allocating a first memory location in the shared buffer to the first set of data and a second memory location in the shared buffer to the second set of data, wherein the first memory location is closer to the head memory address than the second memory location;
   saving the first set of data to the first memory location at a first speed and the second set of data to the second memory location at a second speed, wherein the first speed is slower than the second speed;
   asynchronously saving the first set of data in to the first memory location and the second set of data to the second memory location by initiating saving the first set of data before initiating saving the second set of data;
   sequentially transmitting data from the shared buffer to a target device from the head memory address to the tail memory address.

2. The computer-implemented method of claim 1, wherein the first request and the second request are received by a first thread and a second thread, respectively.

3. The computer-implemented method of claim 2, further comprising providing the first memory location to the first thread and the second memory location to the second thread.

4. The computer-implemented method of claim 1, wherein the first request and the second request are received by processes of an operating system.

5. The computer-implemented method of claim 1, wherein the first request and the second request are received by discrete computer systems.

6. The computer-implemented method of claim 1, wherein the step of asynchronously saving the first and second sets of data further comprises terminating saving the second set of data before terminating saving the first set of data.

7. The computer-implemented method of claim 1, wherein the step of asynchronously saving the first and second sets of data further comprises terminating saving the first set of data before terminating saving the second set of data.

8. A system for transmitting data, comprising: a buffer handler that receives: a first request to transmit a first set of data before receiving a second request to transmit at least a second set of data; a shared buffer that allocates a first memory location to the first set of data and a second memory location to the second set of data, wherein the shared buffer comprises a head memory address and a tail memory address, wherein the first memory location is closer to the head memory address of the shared buffer than the second memory location, and wherein the shared buffer asynchronously saves the first set of data to the first memory location at a first speed and the second set of data to the second memory location at a second speed by initiating saving the first set of data before initiating the second set of data, wherein the first speed is slower than the second speed; and a transmitter that sequentially transmits data from the shared buffer to a target device from the head memory address to the tail memory address.

9. The system of claim 8, wherein the first request and the second request are received by a first thread and a second thread, respectively.

10. The system of claim 8, wherein the buffer handler provides the first memory location to the first thread and the second memory location to the second thread.

11. The system of claim 8, wherein the first request and the second request are received by processes of an operating system.

12. The system of claim 8, wherein the first request and the second request are received by discrete computer systems.

13. The system of claim 8, wherein the shared buffer terminates saving the second set of data before terminating saving the first set of data.

14. The system of claim 8, wherein the shared buffer terminates saving the first set of data before terminating saving the second set of data.

* * * * *